US009622256B2

United States Patent
Zhao et al.

(10) Patent No.: US 9,622,256 B2
(45) Date of Patent: Apr. 11, 2017

(54) METHOD AND APPARATUS FOR RECEIVING FRAGMENT AS WELL AS METHOD AND APPARATUS FOR TRANSMITTING FRAGMENT

(71) Applicant: Huawei Technologies Co., Ltd., Shenzhen, Guangdong (CN)

(72) Inventors: Mu Zhao, Shenzhen (CN); Zhihao Xing, Shenzhen (CN); Yanping Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 188 days.

(21) Appl. No.: 14/208,893

(22) Filed: Mar. 13, 2014

(65) Prior Publication Data

US 2014/0211708 A1 Jul. 31, 2014

Related U.S. Application Data

(63) Continuation of application No. PCT/CN2012/081487, filed on Sep. 17, 2012.

(30) Foreign Application Priority Data

Sep. 16, 2011 (CN) .......................... 2011 1 0276082
Oct. 26, 2011 (CN) .......................... 2011 1 0329828

(51) Int. Cl.
*H04W 4/00* (2009.01)
*H04W 72/10* (2009.01)
(Continued)

(52) U.S. Cl.
CPC ........... *H04W 72/10* (2013.01); *H04L 1/1803* (2013.01); *H04L 1/1854* (2013.01);
(Continued)

(58) Field of Classification Search
CPC ..................................................... H04L 1/1858
See application file for complete search history.

(56) References Cited

U.S. PATENT DOCUMENTS

| 5,570,367 A | 10/1996 | Ayanoglu et al. |
| 6,567,388 B1 | 5/2003 | Tomcik et al. |

(Continued)

FOREIGN PATENT DOCUMENTS

| CN | 1123980 A | 6/1996 |
| CN | 1586048 A | 2/2005 |

(Continued)

OTHER PUBLICATIONS

"IEEE Standard for Information Technology, Telecommunications and Information Exchange Between Systems, Local and metropolitan Area Networks, Specific Requirements, Part 15.4: Wireless Medium Access Control (MAC) and Physical :Layer (PHY) Specifications for Low-Rate Wireless Personal Area Networks (WPANs)," IEEE Std 802.15.4™-2006, Institute for Electrical and Electronic Engineers, New York, New York (Sep. 8, 2006).

(Continued)

*Primary Examiner* — Joseph Bednash
*Assistant Examiner* — Kevin Cunningham
(74) *Attorney, Agent, or Firm* — Leydig, Voit & Mayer, Ltd.

(57) ABSTRACT

Embodiments of the present invention provide a method and apparatus for receiving fragments as well as a method and apparatus for transmitting fragments. The method for receiving fragments includes: receiving a group of fragments from a transmitter through a first channel, where the transmitter suspend transmitting a next group of fragments after the group of fragments is transmitted; and transmitting one or a plurality of first acknowledgement messages to the transmitter through the first channel immediately after the group (Continued)

of fragments are received. According to embodiments of the present invention, the acknowledgement messages may be immediately transmitted to the transmitter through a current channel after one group of fragments are received through the current channel, thereby avoiding the delay of a fragment receiving and transmitting process, which is caused by the competition and occupation of the channel by other nodes, and thus improving transmission efficiency.

15 Claims, 5 Drawing Sheets

(51) Int. Cl.
 H04L 1/18 (2006.01)
 H04L 29/08 (2006.01)
(52) U.S. Cl.
 CPC .......... *H04L 1/1858* (2013.01); *H04L 1/1887* (2013.01); *H04L 69/324* (2013.01)

(56) References Cited

U.S. PATENT DOCUMENTS

| | | | |
|---|---|---|---|
| 7,161,952 B1* | 1/2007 | Herrmann | H04W 74/0866 370/329 |
| 2003/0100268 A1 | 5/2003 | Moulsley et al. | |
| 2005/0238054 A1 | 10/2005 | Sharma | |
| 2005/0265371 A1 | 12/2005 | Sharma et al. | |
| 2008/0225728 A1* | 9/2008 | Plamondon | 370/237 |
| 2009/0086638 A1* | 4/2009 | Niu | H03M 13/1102 370/238 |
| 2009/0154485 A1* | 6/2009 | Park et al. | 370/438 |
| 2009/0268747 A1* | 10/2009 | Kurata et al. | 370/412 |
| 2010/0131817 A1* | 5/2010 | Kong | H04L 1/06 714/749 |
| 2011/0158139 A1* | 6/2011 | Park | 370/310 |

FOREIGN PATENT DOCUMENTS

| | | |
|---|---|---|
| CN | 1744485 A | 3/2006 |
| CN | 101692739 A | 4/2010 |
| EP | 1626518 A2 | 2/2006 |
| EP | 1626520 A1 | 2/2006 |
| WO | WO 03081837 A1 | 10/2003 |

OTHER PUBLICATIONS

Tang et al., "Information exchange applying sliding window technique based on CAN network," Electric power Automation Equipment, vol. 29, No. 1, pp. 147-150 (Jan. 2009).

Rios, "LCW Proposal for High Rate WPAN Combined PHY and MAC," Working Group for Wireless Personal Area Networks (WPANs), Institute of Electrical and Electronics Engineers, New York, New York (Sep. 5, 2000).

Xu et al., "Towards Analysis of Intra-Flow Contention in Multi-hop Wireless Networks," IEEE 2010 Sixth International Conference on Mobile Ad-hoc and Sensor Networks, pp. 176-184, Institute of Electrical and Electronics Engineers, New York, New York (2010).

\* cited by examiner

METHOD AND APPARATUS FOR RECEIVING FRAGMENT AS WELL AS METHOD AND APPARATUS FOR TRANSMITTING FRAGMENT

CROSS REFERENCE TO RELATED APPLICATIONS

This application is a continuation of International Patent Application No. PCT/CN2012/081487, filed on Sep. 17, 2012, which claims priority to Chinese Patent Application No. 201110276082.9, filed on Sep. 16, 2011, and Chinese Patent Application No. 201110329828.8, filed on Oct. 26, 2011, all of which are incorporated herein by reference in their entireties.

TECHNICAL FIELD

Embodiments of the present invention relate to the field of communication technology and, in particular, to a method and an apparatus for receiving fragments as well as a method and an apparatus for transmitting fragments.

BACKGROUND

Fragment receiving and transmitting is a common method for enhancing transmission reliability in radio transmission. Generally speaking, the fragment receiving and transmitting refers to a method that a transmitter divides a complete MAC layer data frame or command frame into multiple small data packets (also known as fragments), and a receiver receives and combines these small data packets into the original data frame or command frame.

Usually, the transmitter transmits the data frame or command frame to the receiver after dividing it into fragments. The transmitter suspends transmitting and waits for an acknowledgement message after transmitting each group of fragments. The receiver transmits, after receiving each group of fragments, an acknowledgement message including a receiving state of each fragment in the group of fragments to the transmitter. The transmitter transmits, after receiving the acknowledgement message of the group of fragments, next group of fragments. Information of the fragments, which are not correctly received, in the group of fragments may be preferentially included in the next group of fragments.

The receiver needs to compete for a channel when transmitting the acknowledgement message including the receiving state of each fragment in the group of fragments. To be specific, the channel may be competed and occupied by other nodes during a period from the transmitter completely transmitting the last fragment of each group to the receiver preparing to transmit the acknowledgement message; therefore, the acknowledgement message cannot be transmitted in time, thus an entire fragment receiving and transmitting process is delayed.

SUMMARY

Embodiments of the present invention provide a method and an apparatus for receiving fragments as well as a method and an apparatus for transmitting fragments, which can transmit an acknowledgement message in time after receiving a fragment, thus improving transmission efficiency.

In one aspect, a method for receiving fragment is provided, including the steps as follows: receiving a group of fragments from a transmitter through a first channel, where the transmitter suspends transmitting a next group of fragments after the group of fragments are transmitted; and transmitting one or a plurality of first acknowledgement messages to the transmitter through the first channel immediately after the said group of fragments are received.

In another aspect, a method for transmitting fragment is provided, including the steps as follows: transmitting a group of fragments to a receiver through a first channel and suspending transmitting a next group of fragments to the receiver after the group of fragments are transmitted; and receiving one or a plurality of first acknowledgement messages from the receiver through the first channel, where the receiver immediately transmits the one or the plurality of first acknowledgement messages through the first channel after the group of fragments are received.

In another aspect, an apparatus for receiving fragment is provided, including a receiving module and a transmitting module. The receiving module is configured to receive a group of fragments from a transmitter through a first channel, where the transmitter suspends transmitting next group of fragments after the group of fragments is transmitted. The transmitting module is configured to transmit one or a plurality of first acknowledgement messages to the transmitter through the first channel immediately after the group of fragments is received.

In another aspect, an apparatus for transmitting fragment is provided, including a transmitting module and a receiving module. The transmitting module is configured to transmit a group of fragments to a receiver through a first channel and suspend transmitting a next group of fragments to the receiver after the group of fragments is transmitted. The receiving module is configured to receive one or a plurality of first acknowledgement messages from the receiver through the first channel, where the receiver immediately transmits the one or the plurality of first acknowledgement messages through the first channel after the group of fragments are received.

According to embodiments of the present invention, the acknowledgement messages may be immediately transmitted to the transmitter through a current channel after one group of fragments are received through the current channel, thereby avoiding a delay of a fragment receiving and transmitting process, which is caused by the competition and occupation of the channel by other nodes, and thus improving transmission efficiency.

BRIEF DESCRIPTION OF DRAWINGS

To illustrate the technical solutions in embodiments of the present invention more clearly, the following briefly introduces the accompanying drawings for describing the embodiments or the prior art. Apparently, the accompanying drawings in the following description only show some embodiments of the present invention, and a person of ordinary skill in the art may still derive other drawings from these accompanying drawings without creative efforts.

DESCRIPTION OF EMBODIMENTS

Figure 1:
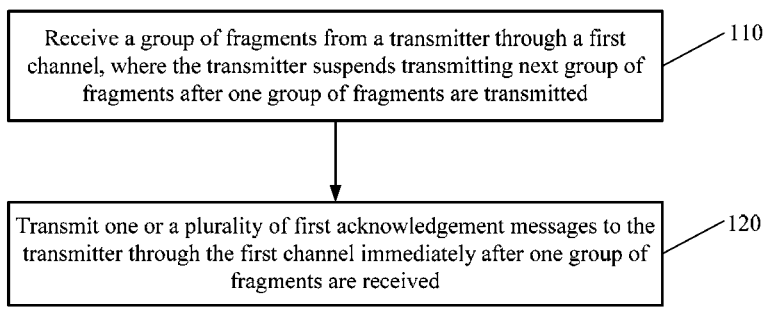
FIG. 1 is a schematic flowchart of a method for receiving fragments according to an embodiment of the present invention.

The following clearly and completely describes the technical solutions in embodiments of the present invention with reference to the accompanying drawings in embodiments of the present invention. Apparently, the described embodiments are merely a part rather than all of the embodiments of the present invention. All other embodiments obtained by a person of ordinary skill in the art based on embodiments of the present invention without creative efforts shall fall within the protection scope of the present invention.

The technical solutions of the present invention may be applied to various communication systems, for example: a GSM, a code division multiple access (CDMA, Code Division Multiple Access) system, wideband code division multiple access wireless (WCDMA, Wideband Code Division Multiple Access Wireless), a general packet radio service (GPRS, General Packet Radio Service), long term evolution (LTE, Long Term Evolution), wireless local area network (WLAN, Wireless Local Area Networks), wireless fidelity (Wifi, Wireless Fidelity), and the like.

A user equipment (UE, User Equipment), which may also be called a mobile terminal (Mobile Terminal), a mobile user equipment and the like, may communicate with one or more core networks through a radio access network (for example, RAN, Radio Access Network). The user equipment may be a mobile terminal, such as a mobile phone (or called a "cellular" phone) and a computer having a mobile terminal, for example, it may be a portable, a pocket, a handheld, a computer built-in or a vehicle-mounted mobile apparatus, which exchange language and/or data with the radio access network.

A base station may be a base transceiver station (BTS, Base Transceiver Station) in the GSM or the CDMA, or a base station (NodeB) in the WCDMA, or further an evolutional base station (eNB or e-NodeB, evolutional Node B) in the LTE, which is not limited in the present invention.

It takes longer time to transmit a data frame or command frame in a form of fragment than to normally transmit a data frame or command frame. Therefore, a possibility of channel quality change is larger. If the channel quality is poorer, subsequent receiving and transmitting of the fragments may be affected; for example, error fragments increase, and the like. Therefore, the channel may need to be changed in a fragment receiving and transmitting process of the data frame or command frame or between two adjacent fragment receiving and transmitting processes of the data frame or command frame.

A communication parameter, such as a data rate, may further need to be changed in the fragment receiving and transmitting process of the data frame or command frame or between two adjacent fragment receiving and transmitting processes of the data frame or command frame.

In addition, a certain degree of resource waste will be caused if the receiver needs to return an answer or acknowledgement including receiving states of all the fragments in one group of fragments to the transmitter no matter whether the group of fragments are correctly received.

FIG. 1 is a schematic flowchart of a method for receiving fragments according to an embodiment of the present invention. The method shown in FIG. 1 may be executed by a receiver. The receiver may be communication equipments, for example, a base transceiver station, a user equipment, and the like.

Step 110: receiving a group of fragments from a transmitter through a first channel, where the transmitter suspends transmitting a next group of fragments after the group of fragments are transmitted.

For example, the transmitter may divide a data frame or command frame of an MAC layer into fragments and then transmit these fragments to the receiver through a current operating channel and preset (or set by a system) the number n (n is less than or equal to the number of all the fragments) of fragments in each group with the receiver. The transmitter may suspend transmitting the next group of fragments after one group of fragments is transmitted, so as to wait for an answer or acknowledgement of the receiver. The next group of fragments and the one group of fragments may belong to the same data frame or command frame. When all the fragments of the data frame or command frame to which the group of fragments belong are completely transmitted, the next group of fragments may also be a first group of fragments of the next data frame or command frame.

Step 120: transmitting one or a plurality of first acknowledgement messages to the transmitter through the first channel immediately after the said group of fragments are received.

Immediately transmitting the one or the plurality of first acknowledgement message to the transmitter through the first channel refers to that no other messages exists between the received first group of fragments and the first acknowledgement message, but is not intended to limit an interval between the first group of fragments and the first acknowledgement message.

For example, the first acknowledgement message may be a positive-acknowledgement message (ACK, Acknowledgement), which may also be called an ACK frame, i.e., a frame which is transmitted from the receiver to the transmitter and used for acknowledging the correctly receiving of each group of fragments. The first acknowledgement message may also be a negative-acknowledgement message (NACK, Negative-Acknowledgement), which may also be called an NACK frame, i.e., a frame which is transmitted from the receiver to the sending end and used for indicating that not all group of fragments are correctly received and/or a switching from the current operating channel to another channel is required and/or updating a communication parameter is required. The first acknowledgement message does not include a receiving state of each fragment in the group of fragments. In other words, a frame structure of the first acknowledgement message is simple, short and small, and can be created and directly transmitted by hardware (or a physical layer)

According to embodiments of the present invention, the acknowledgement messages may be immediately transmitted to the transmitter through a current operating channel after one group of fragments are received through the current operating channel, thereby avoiding a delay of the fragment receiving and transmitting process, which is caused by the competition and occupation of the channel by other nodes, and thus improving transmission efficiency.

According to embodiments of the present invention, in a case that one or a plurality of fragments in the group of fragments are not correctly received, and/or in a case that a switching from the first channel to a second channel is required, and/or in a case that updating a communication parameter is required, the one or the plurality of first acknowledgement messages include back-to-back negative-acknowledgement messages. The method shown in FIG. 1 further includes: setting a second acknowledgement message after the group of fragments are received; stopping transmitting the back-to-back negative-acknowledgement messages to the transmitter after the second acknowledgement message is set, and immediately transmitting the second acknowledgement message to the transmitter through the first channel.

For example, the second acknowledgement message may be an enhanced acknowledgement message (EACK, Enhanced ACK) frame, which may carry a plurality of information according to demands, such as receiving state information of each fragment (which may also include only information of the fragments that are not correctly received) and/or frequency hopping information (for example, information of the next operating channel and other necessary information) and/or an updated value of other communication parameters (for example, a data transmission rate), where the second acknowledgement message is generally created by an MAC layer or an upper layer of a hierarchical network structure. During a period that the MAC layer or the upper layer prepares the EACK frame, a back-to-back (back-to-back) NACK frame sequence transmitted on the current operating channel may guarantee that other nodes may not compete and occupy the operating channel before the EACK frame is prepared, thereby avoiding delay of a fragment receiving and transmitting process which caused by the competition and occupation of the operating channel by other nodes, and thus improving transmission efficiency.

According to the embodiment of the present invention, in the case that the one or the plurality of fragments in the group of fragments are not correctly received, the second acknowledgement message includes information of the one or the plurality of fragments, which are not correctly received, in the group of fragments, so that the transmitter transmits the next group of fragments including the one or the plurality of fragments that are not correctly received.

For example, the receiver may set the fragments that are not correctly received in the EACK message when detecting that some fragments in the group of fragments are not correctly received, so that the transmitter knows which fragments are not correctly received when receiving the EACK message.

According to another embodiment of the present invention, in the case that the switching from the first channel to the second channel is required, the second acknowledgement message includes information of the second channel, so that the transmitter transmits the next group of fragments through the second channel.

For example, when the receiver detects that the quality of the current operating channel is lower than a preset threshold; to be specific, when need to switching to a channel with a high quality to implement data transmission, information of the next channel to be switched to may be set in the EACK message, such that the transmitter knows which channel will be switched to when receiving the EACK message.

According to another embodiment of the present invention, in the case that updating the communication parameter is required, the second acknowledgement message includes an updated communication parameter, so that the transmitter updates the communication parameter.

For example, the updated communication parameter may be set in the EACK frame when the receiver detects that a current communication parameter (for example, a data transmission rate, and the like) cannot meet requirements, so that the transmitter knows which communication parameter need to be updated when receiving the EACK frame.

According to another embodiment of the present invention, the second acknowledgement message further includes: indication information, which is used for requiring the transmitter to transmit a positive-acknowledgement message after the second acknowledgement message is correctly received, where the positive-acknowledgement message indicates that the second acknowledgement message is correctly received by the transmitter.

For example, the positive-acknowledgement message is an ACK frame with a simple and short frame structure, so that the receiver knows whether the transmitter receives the EACK frame.

According to another embodiment of the present invention, in the case that the group of fragments are all correctly received, the one or the plurality of first acknowledgement messages include a positive-acknowledgement message, so that the transmitter continuously transmits the next group of fragments, where the positive-acknowledgement message indicates that the group of fragments are correctly received.

For example, the positive-acknowledgement message is an ACK frame with a simple and short frame structure. Since the receiver transmits only the ACK frame in the case that the group of fragments are all successfully received, and the ACK frame with the simple and short frame structure does not include receiving state information of each fragment, resources are saved and the operating flow is simplified.

Transmitting the second acknowledgement message including a receiving state of each fragment closely after the first acknowledgement message not only guarantee that the current operating channel cannot be competed and occupied by other nodes so as to improve transmission efficiency, but also enables the transmitter to retransmit the fragments that are not correctly received so as to improve the data transmission reliability. In addition, the second acknowledgement message may further include frequency hopping information and/or an updated value of other communication parameters, so that the transmitter and the receiver may in time change a channel and/or a corresponding communication parameter value when the quality of the first channel is poorer and/or other network parameters are changed, thus improving the transmission reliability. Finally, if the group of fragments are all correctly received, the receiver only needs to transmit a simple and short acknowledgement message, and does not need to transmit the second acknowledgement message including the receiving state of each fragment. Therefore, the operating flow is simplified.

Figure 2:
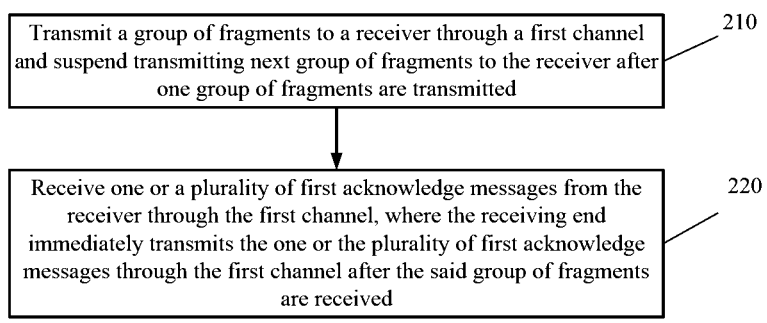
FIG. 2 is a schematic flowchart of a method for transmitting fragments according to another embodiment of the present invention.

FIG. 2 is a schematic flowchart of a method for transmitting fragments according to another embodiment of the present invention. The method shown in FIG. 2 may be executed by a transmitter. The transmitter may be a communication equipment, for example, a base transceiver station, an user equipment, and the like. The method shown in FIG. 2 corresponds to the method shown in FIG. 1, and thus is not described herein any further.

Step 210: transmitting a group of fragments to a receiver through a first channel, and suspending transmitting a next group of fragments to the receiver after the group of fragments are transmitted.

Step 220: receiving one or a plurality of first acknowledgement messages from the receiver through the first channel, where the receiver immediately transmits the one or the plurality of first acknowledgement messages through the first channel after the group of fragments are received.

According to the embodiment of the present invention, the transmission of the next group of fragments is suspended after one group of fragments are transmitted to the receiver through a current operating channel, and an acknowledgement message immediately returned by the receiver after receiving the group of fragments can be received through the current operating channel. Since the current operating channel is not completed and occupied by other nodes, a fragment receiving and transmitting process is not delayed, thus improving transmission efficiency.

According to another embodiment of the present invention, in a case that one or a plurality of fragments in the group of fragments are not correctly received, and/or in a case that a switching from the first channel to a second channel is required, and/or in a case that updating a communication parameter is required, the one or the plurality of first acknowledgement messages include back-to-back negative-acknowledgement messages, where the method further includes: receiving a second acknowledgement message from the receiver after the back-to-back negative-acknowledgement messages are received.

According to another embodiment of the present invention, in the case that the one or the plurality of fragments in the group of fragments are not correctly received, the second acknowledgement message includes information of the one or the plurality of fragments, which are not correctly received, in the group of fragments. The method includes: transmitting a next group of fragments including the one or the plurality of fragments that are not correctly received to the receiver after the second acknowledgement message is received.

For example, the fragments that are not correctly received are preferentially included in the next group of fragments, thus guaranteeing data transmission reliability. Optionally, the transmitter may also choose, according to demands, to retransmit the group of fragments or transmit the next group of fragments excluding the fragments that are not correctly received.

According to another embodiment of the present invention, the second acknowledgement message includes information of the second channel, where the transmitting method further includes: transmitting the next group of fragments through the second channel after the second acknowledgement message is received.

For example, the second channel is a channel having a high quality, and the transmitter uses the second channel as the next operating channel to implement the data transmission, according to the information of the second channel included in the second acknowledgement message, thus guaranteeing the data transmission reliability. Optionally, the transmitter may also continuously use the original operating channel to implement the data transmission according to demands.

According to another embodiment of the present invention, the second acknowledgement message further includes an updated communication parameter. The method further includes: updating the communication parameter after the second acknowledgement message is received.

For example, the updated parameter included in the second acknowledgement message refers to a more proper communication parameter which is expected, by the receiver, to be employed by the transmitter. The transmitter may use the updated communication parameter included in the second acknowledgement message to implement the data transmission. Optionally, the transmitter may also continuously use the original communication parameter to implement the data transmission according to demands.

According to another embodiment of the present invention, the second acknowledgement message further includes: indication information, which is used for transmitting, according to the indication information, a positive-acknowledgement message to the receiver after the second acknowledgement message is received. The method further includes: transmitting the positive-acknowledgement message to the receiver after the indication information is received, where the positive-acknowledgement message indicates that the second acknowledgement message is correctly received.

For example, after an EACK frame is received, the transmitter feeds back an ACK frame to the receiver. If the EACK frame includes the information of the second channel, after receiving the ACK frame, the receiver knows that the transmitter will implement the data transmission next through the second channel. Accordingly, the receiver may receive data through the second channel.

According to another embodiment of the present invention, the method further includes: receiving a positive acknowledgement message from the receiver through the first channel in a case that the said group of fragments are all correctly received, where the positive acknowledgement message indicates that the group of fragments are correctly received by the receiver. The method further includes: continuously transmitting the next group of fragments.

Transmitting the second acknowledgement message including a receiving state of each fragment closely after the first acknowledgement message not only guarantee that the current operating channel cannot be competed and occupied by other nodes so as to improve transmission efficiency, but also enables the transmitter to retransmit the fragments that are not correctly received so as to improve the data transmission reliability. In addition, the second acknowledgement message may further include frequency hopping information and/or an updated value of other communication parameters, so that the transmitter and the receiver may in time change a channel and/or a corresponding communication parameter value when the quality of the first channel is poorer and/or other network parameters are changed, thus improving the transmission reliability. Finally, if the group of fragments are all correctly received, the receiver only needs to return a simple and short acknowledgement message, and does not need to return the second acknowledgement message including the receiving state of each fragment. Therefore, the operating flow is simplified.

Figure 3A:
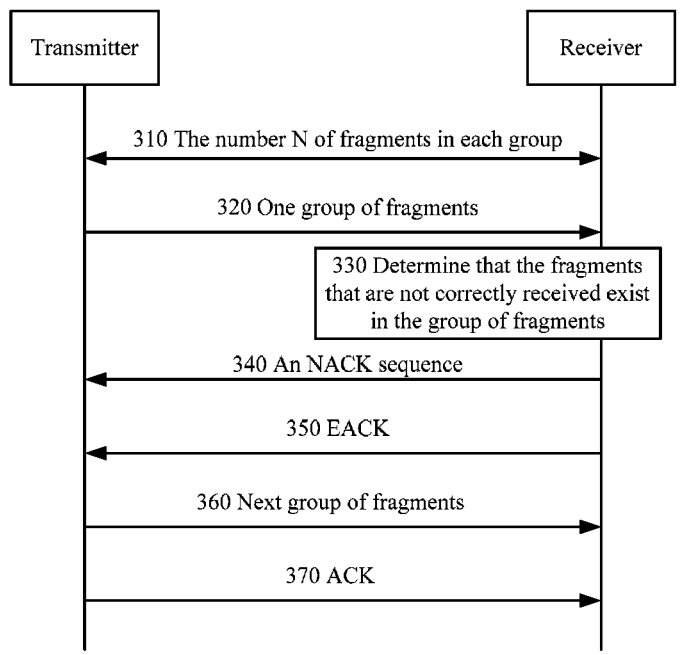
FIG. 3A is a schematic flowchart of a fragment receiving and transmitting process according to an embodiment of the present invention.
Figure 3B:
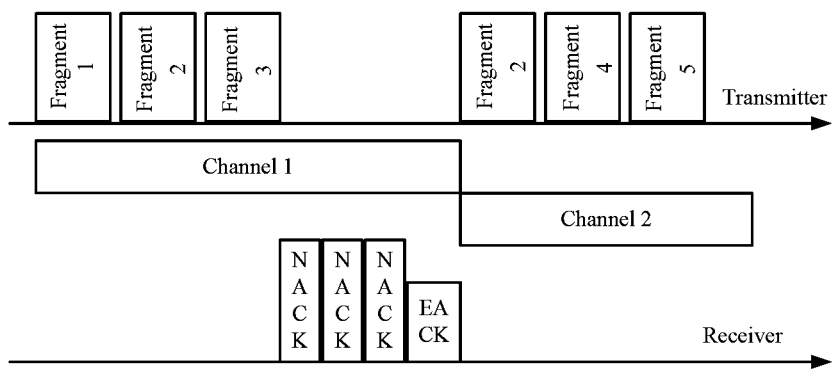
FIG. 3B is a schematic view of a fragment receiving and transmitting process according to an embodiment of the present invention.

FIG. 3A is a schematic flowchart of a fragment receiving and transmitting process according to an embodiment of the present invention. FIG. 3B is a schematic view of a fragment receiving and transmitting process according to an embodiment of the present invention. The method shown in FIG. 1 and the method shown in FIG. 2 are illustrated hereinafter with reference to FIG. 3A and FIG. 3B.

Step 310: The number N of fragments in each group is preset, where N is less than or equal to the number of all the fragments of one data frame or command frame. N may be set through information interaction of a transmitter and a receiver, and may also be set manually or through a system. For example, N is equal to 3 in FIG. 3B.

Step 320: The transmitter transmits a group of fragments of the data frame or command frame to the receiver, and suspends transmitting the next group of fragments after the group of fragments are transmitted, to wait for an answer of the receiver. For example, in FIG. 3B, after fragments 1, 2 and 3 are transmitted, transmission of the next group of fragments is suspended.

Step 330: After one group of fragments are received, the receiver determines whether some fragments that are not correctly received exist in the group of fragments and/or whether the quality of the channel is lower than a preset threshold and/or whether other communication parameters (for example, data rate) need to be changed.

Step 340: If it is determined that the fragments that are not correctly received exist and/or the quality of the channel is lower than the preset threshold and/or other communication parameters (for example, data rate) needs to be changed, the receiver immediately transmits back-to-back (back-to-back) NACK frames (for example, three NACK frames in FIG. 3) to the transmitter, and prepares an enhanced acknowledgement message which, to be specific, is an EACK (Enhanced ACK) frame at the same time. The NACK frame has a simple, short and small structure, and does not include the information included in the EACK frame. The EACK frame may include receiving state information of each fragment in the group of fragments (optionally, may also include only information of the fragments that are not correctly received) and/or frequency hopping information (that is, information of another channel which is different from a current channel and other necessary frequency hopping related information) and/or an updated value of other communication parameters.

Table 1 below illustrates a frame structure of the NACK frame or other frames having the same functions.

TABLE 1

| Frame header | Serial number | Check code |
| --- | --- | --- |

In Table 1, the frame header is used to indicate a frame type as an NACK frame and other information. The serial number in used to indicate the fragments corresponding to the NACK frame.

Table 2 below illustrates a frame structure of the EACK frame or other frames having the same functions.

TABLE 2

| Frame header | Address bit | Information element | Payload | Check code |
| --- | --- | --- | --- | --- |

In Table 2, the frame header in used to indicate a frame type as an EACK frame and other information. The address bit is used to indicate address information of receiving and transmitting the EACK frame. Some normalized information may be placed in the information element (IE, Information Elements) according to demands. Any information may be placed in the payload (payload) according to demands. The receiving state information of the fragments and/or the frequency hopping information and/or the updated value of the communication parameter may be placed in the information element and/or the payload. It should be noted that, according to the embodiment of the present invention, the EACK frame may be a specific frame in the IEEE 802.15.4 standard. Any data frame or command frame having the same functions as that of the EACK may replace the EACK frame in the present invention. The EACK frame (or the frame having the same functions) includes the frequency hopping information and/or the updated value(s) of other communication parameter(s), so that the transmitter and the receiver may in time change a channel and/or a corresponding communication parameter value when the quality of the first channel is poorer and/or other network parameters are changed, thus improving transmission reliability.

Step 350: After the EACK frame is prepared, the receiver stops transmitting the back-to-back NACK frames and closely transmits the EACK frame to the transmitter.

Step 360: The transmitter receives the EACK frame and continuously transmits the next group of fragments after making corresponding changes according to the information included in the EACK frame. If the information of the fragments that are not correctly received, such as the fragment 2 in FIG. 3B, is included in the EACK frame, the transmitter may preferentially retransmit the fragments in the next group of fragments. If the frequency hopping information, such as information of a channel 2 in FIG. 3B, is included in the EACK frame, the transmitter and the receiver change channels to implement communications according to the information; for example, communication is implemented through the channel 2 in FIG. 3B. If the updated values of other communication parameters are included in the EACK frame, the transmitter updates the communication parameters and then restarts fragment transmitting. If N is equal to the number of all the fragments of one data frame or command frame, each data frame or command frame has only one group of fragments, i.e., the transmitter and the receiver execute the following operations after receiving and transmitting all the fragments of the data frame or command frame. Moreover, "next group of fragments" in step 360 refer to fragments of the next data frame or command frame.

Step 370: An identifier may be set in the EACK frame to enable the transmitter which receives the EACK frame to return an ACK frame. Even if the EACK frame includes the frequency hopping information, both the EACK frame and the ACK frame thereof are received and transmitted through the original channel. Optionally, the ACK frame may also be transmitted through other channels Optionally, the step 370 may be omitted.

The table 3 below illustrates a frame structure of the ACK frame or other frame having the same functions.

TABLE 3

| Frame header | Serial number | Check code |
| --- | --- | --- |

The frame header is used to indicate a type of the frame which is an ACK frame and other information. The serial number is used to indicate the fragments corresponding to the ACK frame.

Figure 4A:
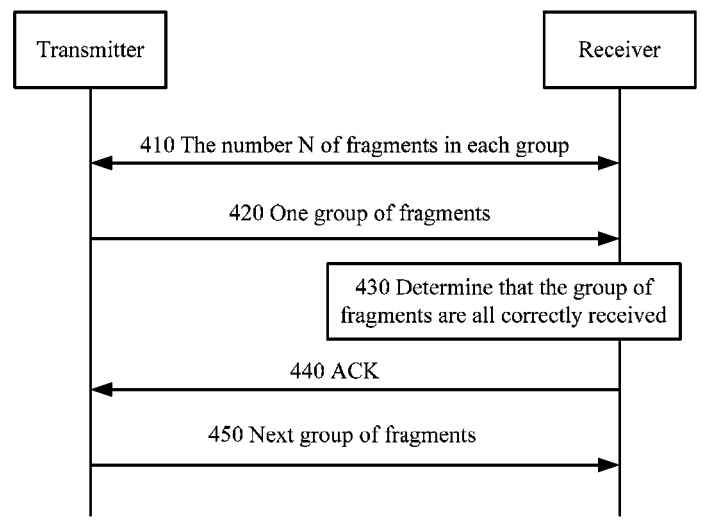
FIG. 4A is a schematic flowchart of a fragment receiving and transmitting process according to another embodiment of the present invention.
Figure 4B:
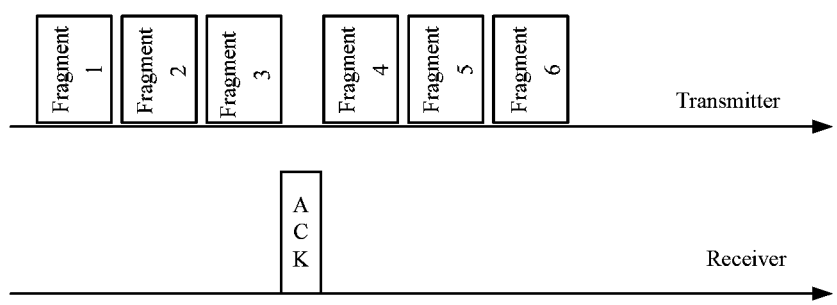
FIG. 4B is a schematic view of a fragment receiving and transmitting process according to another embodiment of the present invention.

FIG. 4A is a schematic flowchart of a fragment receiving and transmitting process according to another embodiment of the present invention. FIG. 4B is a schematic view of a fragment receiving and transmitting process according to another embodiment of the present invention. The method shown in FIG. 1 and the method shown in FIG. 2 will be illustrated hereinafter with reference to FIG. 4A and FIG. 4B.

Step 410: The number N of fragments in each group is preset, where N is no more than the number of all the fragments of one data frame or command frame. N may be set through information interaction of a transmitter and a receiver, and may also be set manually or through a system. For example, N is equal to 3 in FIG. 3B.

Step 420: The transmitter suspends transmitting the next group of fragments after one group of fragments are transmitted, to wait for a message from the receiver.

Step 430: After receiving one group of fragments, the receiver immediately transmits an ACK frame to the transmitter if the group of fragments is correctly received (refer to FIG. 4B). An ACK frame structure is the same as the ACK frame structure in table 3, which is simple, short and small. Moreover, receiving state information of each fragment in the group is not included.

Step 440: The transmitter continuously transmits the next group of fragments after the ACK frame is received.

If the group of fragments are all correctly received, the receiver only needs to return the ACK frame, and does not need to return an EACK frame (or a frame having the same functions) including information of the fragments that are not correctly received. Therefore, the operating flow is simplified in a case that same effects are achieved. If N is equal to the number of all the fragments of one data frame or command frame, each data frame or command frame has only one group of fragments, i.e., the transmitter and the receiver execute following operations after receiving and transmitting all the fragments. Moreover, "next group of fragments" in step 440 refer to fragments of the next data frame or command frame.

The above describes the method for receiving fragments and the method for transmitting fragments according to embodiments of the present invention. The following describes an apparatus for receiving fragments and an apparatus for transmitting fragments according to embodiments of the present invention with reference to FIG. 5 to FIG. 8.

Figure 5:
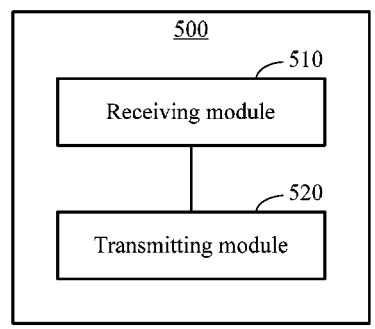
FIG. 5 is a schematic structural view of an apparatus for receiving fragment 500 according to an embodiment of the present invention.

FIG. 5 is a schematic structural view of an apparatus 500 for receiving fragments according to an embodiment of the present invention. The apparatus 500 includes a receiving module 510 and a transmitting module 520.

The receiving module 510 receives a group of fragments from a transmitter through a first channel, where the transmitter suspends transmitting A next group of fragments after the group of fragments are transmitted. The transmitting module 520 immediately transmits one or a plurality of first acknowledgement messages to the transmitter through the first channel after the group of fragments are received by the receiving module 510.

According to the apparatus of the embodiment of the present invention, the acknowledgement messages may be immediately transmitted to the transmitter through a current operating channel after one group of fragments are received through the current operating channel, thereby avoiding a delay of the a fragment receiving and transmitting process, which is caused by the competition and occupation of the channel by other nodes, and thus improving transmission efficiency.

Operations and functions of each unit of the apparatus 500 may refer to the step 110 and the step 120 in the method shown in FIG. 1, and thus are not described herein any further for avoiding repetition.

Figure 6:
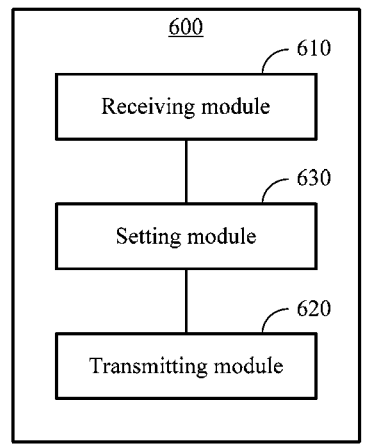
FIG. 6 is a schematic structural view of an apparatus for receiving fragment 600 according to another embodiment of the present invention.

FIG. 6 is a schematic structural view of an apparatus 600 for receiving fragments according to another embodiment of the present invention. The apparatus 600 includes a receiving module 610 and a transmitting module 620, which are similar to the 510 and the 520 in FIG. 5, and thus are not described herein any further.

According to the embodiment of the present invention, in a case that one or a plurality of fragments in the group of fragments are not correctly received, and/or in a case that a switching from the first channel to a second channel is required, and/or in a case that updating a communication parameter is required, the one or the plurality of first acknowledgement messages include back-to-back negative-acknowledgement messages. The apparatus 600 further includes: a setting module 630. The setting module 630 sets a second acknowledgement message after the group of fragments are received by the receiving module 610, where the transmitting module 620 stops transmitting the back-to-back negative-acknowledgement messages to the transmitter after the second acknowledgement message is set, and immediately transmits the second acknowledgement message to the transmitter through the first channel.

According to another embodiment of the present invention, in the case that the one or the plurality of fragments in the group of fragments are not correctly received, the second acknowledgement message includes information of the one or the plurality of fragments, which are not correctly received, in the group of fragments, so that the transmitter transmits the next group of fragments including the one or the plurality of fragments that are not correctly received.

According to another embodiment of the present invention, in the case that the switching from the first channel to the second channel is required, the second acknowledgement message includes information of the second channel, so that the transmitter transmits next group of fragments through the second channel.

According to another embodiment of the present invention, in the case that updating the communication parameter is required, the second acknowledgement message includes an updated communication parameter, so that the transmitter updates the communication parameter.

According to another embodiment of the present invention, the second acknowledgement message further includes: indication information, which is used for requiring the transmitter to transmit a positive-acknowledgement message after the second acknowledgement message is correctly received. The one positive-acknowledgement message indicates that the second acknowledgement message is correctly received by the transmitter.

According to another embodiment of the present invention, in the case that the group of fragments are all correctly received, the one or the plurality of first acknowledgement messages include a positive-acknowledgement message, so that the transmitter continuously transmits the next group of fragments, where the positive-acknowledgement message indicates that the group of fragments are correctly received.

Operations and functions of each unit of the apparatus 600 may refer to the step 110 and the step 120 in the method shown in FIG. 1, and thus are not described herein any further for avoiding repetition.

Transmitting the second acknowledgement message including a receiving state of each fragment closely after the first acknowledgement message not only guarantee that the current operating channel cannot be competed and occupied by other nodes so as to improve transmission efficiency, but also enables the transmitter to retransmit the fragments that are not correctly received so as to improve the data transmission reliability. In addition, the second acknowledgement message may further include frequency hopping information and/or an updated value of other communication parameters, so that the transmitter and the receiver may in time change a channel and/or a corresponding communication parameter value when the quality of the first channel is poorer and/or other network parameters are changed, thus improving the transmission reliability. Finally, if the group of fragments is correctly received, the receiver only needs to transmit a simple and short acknowledgement message, and does not need to transmit the second acknowledgement message including the receiving state of each fragment. Therefore, the operating flow is simplified.

Figure 7:
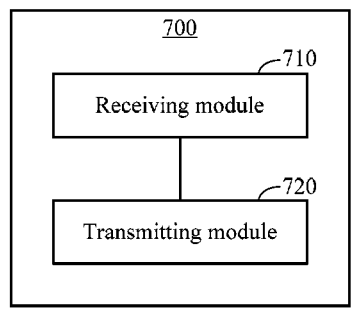
FIG. 7 is a schematic structural view of an apparatus for transmitting fragment 700 according to another embodiment of the present invention.

FIG. 7 is a schematic structural view of an apparatus 700 for transmitting fragments according to another embodiment of the present invention. The apparatus 700 includes a receiving module 710 and a transmitting module 720.

The transmitting module 720 transmits a group of fragments to a receiver through a first channel, and suspends transmitting a next group of fragments to the receiver after the group of fragments are transmitted. The receiving module 710 receives one or a plurality of first acknowledgement messages from the receiver through the first channel, where the receiver immediately transmits the one or the plurality of first acknowledgement messages through the first channel after the group of fragments transmitted by the transmitting module 720 are received.

According to the apparatus of the embodiment of the present invention, transmission of the next group of fragments may be suspended after one group of fragments are transmitted to the receiver through a current operating channel, and an acknowledgement message immediately returned by the receiver after receiving the group of fragments can be received through the current operating channel. Since the current operating channel is not completed and occupied by other nodes, a fragment receiving and transmitting process is not delayed, thus improving transmission efficiency.

For operations and functions of each unit of the apparatus 700, refer to the step 210 and the step 220 in the method shown in FIG. 2, and thus are not described herein any further for avoiding repetition.

Figure 8:
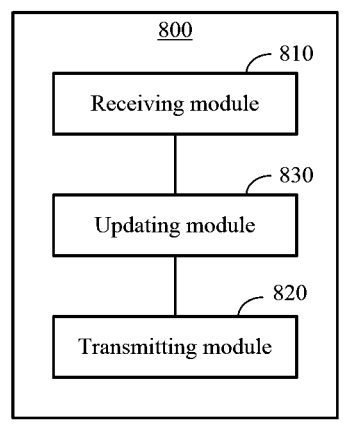
FIG. 8 is a schematic structural view of an apparatus for transmitting fragment 800 according to another embodiment of the present invention.

FIG. 8 is a schematic structural view of an apparatus 800 for transmitting fragment according to another embodiment of the present invention. The apparatus 800 includes a receiving module 810 and a transmitting module 820, which are similar to the 710 and the 720 in FIG. 7, and thus are not described herein any further.

According to the embodiment of the present invention, in a case that one or a plurality of fragments in the group of fragments are not correctly received, and/or in a case that a switching from the first channel to a second channel is required, and/or in a case that updating a communication parameter is required, the one or the plurality of first acknowledgement messages include back-to-back negative-acknowledgement messages, where the receiving module 810 further receives a second acknowledgement message from the receiver after the back-to-back negative-acknowledgement messages are received.

According to another embodiment of the present invention, in the case that the one or the plurality of fragments in the group of fragments are not correctly received, the second acknowledgement message includes information of the one or the plurality of fragments, which are not correctly received, in the group of fragments, where the transmitting module 820 further transmits the next group of fragments including the one or the plurality of fragments that are not correctly received to the receiver after the second acknowledgement message is received.

According to another embodiment of the present invention, the second acknowledgement message includes information of the second channel, where the transmitting module 820 further transmits the next group of fragments through the second channel after the second acknowledgement message is received.

According to another embodiment of the present invention, the second acknowledgement message further includes an updated communication parameter. The apparatus 800 further includes: an updating module 830, configured to update the communication parameter after the second acknowledgement message is received by the receiving module 810.

According to another embodiment of the present invention, the second acknowledgement message further includes: indication information, which is used for transmitting, according to the indication information, a positive-acknowledgement message to the receiver after the second acknowledgement message is received, where the transmitting module 820 further transmits the positive-acknowledgement message to the receiver after the indication information is received. The positive-acknowledgement message indicates that the second acknowledgement message is correctly received.

According to another embodiment of the present invention, where the receiving module 810, in the case that the group of fragments are all correctly received, receives a positive acknowledgement message from the receiver through the first channel. The positive acknowledgement message indicates that the group of fragments is correctly received by the receiver, and the transmitting module 820 continuously transmits next group of fragments.

Transmitting the second acknowledgement message including a receiving state of each fragment closely after the first acknowledgement message not only guarantee that the current operating channel cannot be competed and occupied by other nodes so as to improve transmission efficiency, but also enables the transmitter to retransmit the fragments that are not correctly received so as to improve the data transmission reliability. In addition, the second acknowledgement message may further include frequency hopping information and/or an updated value of other communication parameters, so that the transmitter and the receiver may in time change a channel and/or a corresponding communication parameter value when the quality of the first channel is poorer and/or other network parameters are changed, thus improving the transmission reliability. Finally, if the group of fragments are all correctly received, the receiver only needs to return a simple and short acknowledgement message, and does not need to return the second acknowledgement message including the receiving state of each fragment. Therefore, the operating flow is simplified.

Operations and functions of each unit of the apparatus 800 may refer to the step 210 and the step 220 in the method shown in FIG. 2, and thus are not described herein any further for avoiding repetition.

The embodiments of the present invention further provide a communications system that may include the apparatus for receiving fragments and the apparatus for transmitting fragments described in the above embodiments.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art in the art that, for the purpose of convenient and brief description, for a detailed working process of the foregoing system, apparatuses, and units, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer apparatus (which may be a personal computer, a server, or a network apparatus, etc.) to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disc, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the appended claims.

What is claimed is:

1. A method for receiving fragments, the method comprising:
receiving a first group of fragments from a transmitter through a first channel, wherein the transmitter suspends transmitting a second group of fragments after the first group of fragments is transmitted;
transmitting one or more first acknowledgement messages to the transmitter through the first channel, wherein each of the one or more first acknowledgement messages is a positive-acknowledgement message or a negative-acknowledgement message generated by hardware or a physical layer, and each of the one or more first acknowledgement messages does not include a receiving state of each fragment in the first group of fragment;
wherein in a case that one or more fragments in the first group of fragments are not correctly received, and/or in a case that a switching from the first channel to a second channel is required, and/or in a case that updating a communication parameter is required, the transmitting the one or more first acknowledgement messages to the transmitter through the first channel comprises:
transmitting back-to-back negative-acknowledgement messages to the transmitter through the first channel and generating an enhanced acknowledgement message after the first group of fragments is received, wherein the enhanced acknowledgement message is generated by a MAC layer or an upper layer of a hierarchical network structure, and
stopping transmitting the back-to-back negative-acknowledgement messages to the transmitter after the enhanced acknowledgement message is generated, and subsequently transmitting the enhanced acknowledgement message to the transmitter through the first channel; and
wherein in a case that the first group of fragments are all correctly received, the transmitting one or more first acknowledgement messages to the transmitter through the first channel comprises:
transmitting one positive-acknowledgement message to the transmitter through the first channel.

2. The method according to claim 1, wherein in the case that the one or more fragments in the first group of fragments are not correctly received, the enhanced acknowledgement message comprises information of the one or more fragments, which are not correctly received, in the first group of fragments, so that the transmitter transmits the second group of fragments comprising the one or more fragments that are not correctly received.

3. The method according to claim 1, wherein in the case that the switching from the first channel to the second channel is required, the enhanced acknowledgement message comprises information of the second channel, so that the transmitter transmits the second group of fragments through the second channel.

4. The method according to claim 1, wherein in the case that the updating the communication parameter is required, the enhanced acknowledgement message comprises an updated communication parameter, so that the transmitter updates the communication parameter.

5. The method according to claim 1, wherein the enhanced acknowledgement message comprises: indication information, which is used for requiring the transmitter to transmit a positive-acknowledgement message after the enhanced acknowledgement message is correctly received, wherein the positive-acknowledgement message indicates that the enhanced acknowledgement message is correctly received by the transmitter.

6. A method for transmitting fragments, the method comprising:

transmitting, by a transmitter, a first group of fragments to a receiver through a first channel, and suspending transmitting a second group of fragments to the receiver after the first group of fragments is transmitted;

receiving, by the transmitter, one or more first acknowledgement messages through the first channel, wherein each of the one or more first acknowledgement messages is a positive-acknowledgement message or a negative-acknowledgement message generated by hardware or a physical layer, and the each of the one or more first acknowledgement messages does not include a receiving state of each fragment in the first group of fragments;

wherein in a case that one or more fragments in the first group of fragments are not correctly received by the receiver, and/or in a case that a switching from the first channel to a second channel is required, and/or in a case that updating a communication parameter is required, the receiving the one or more first acknowledgement messages through the first channel comprises:

receiving back-to-back negative-acknowledgement messages from the receiver through the first channel, wherein the receiver transmits the back-to-back negative-acknowledgement messages through the first channel after the first group of fragments is received, and receiving an enhanced acknowledgement message from the receiver after the back-to-back negative-acknowledgement messages are received, wherein the enhanced acknowledgement message is generated by a MAC layer or an upper layer of a hierarchical network structure; and in a case that the first group of fragments are all correctly received by the receiver, the receiving the one or more first acknowledgement messages through the first channel comprises:

receiving one positive-acknowledgement message by the transmitter through the first channel.

7. The method according to claim 6, wherein in the case that the one or more fragments in the first group of fragments are not correctly received, the enhanced acknowledgement message comprises information of the one or more fragments, which are not correctly received, in the first group of fragments, and the method comprises:

transmitting the second group of fragments comprising the one or more fragments that are not correctly received to the receiver after the enhanced acknowledgement message is received.

8. The method according to claim 6, wherein in the case that the switching from the first channel to the second channel is required, the enhanced acknowledgement message comprises information of the second channel, and the method further comprises:

transmitting the second group of fragments through the second channel after the enhanced acknowledgement message is received.

9. The method according to claim 6, wherein in the case that the updating the communication parameter is required, the enhanced acknowledgement message comprises an updated communication parameter, and the method further comprises:

updating the communication parameter after the enhanced acknowledgement message is received.

10. The method according to claim 6, wherein the enhanced acknowledgement message comprises: indication information, which is used for transmitting a positive-acknowledgement message to the receiver according to the indication information after the enhanced acknowledgement message is received, and the method further comprises:

transmitting a positive-acknowledgement message to the receiver after the indication information is received, wherein the positive-acknowledgement message indicates that the enhanced acknowledgement message is correctly received.

11. An apparatus for transmitting fragments, the apparatus comprising:

a transmitter configured to transmit a first group of fragments to a receiver through a first channel, and suspend transmitting a second group of fragments to the receiver after the first group of fragments is transmitted; and the receiver configured to transmit one or more first acknowledgement messages through the first channel, wherein each of the one or more first acknowledgement messages is a positive-acknowledgement message or a negative-acknowledgement message generated by hardware or a physical layer, and each of the one or more first acknowledgement messages does not include a receiving state of each fragment in the first group of fragment;

wherein in a case that one or more fragments in the first group of fragments are not correctly received by the receiver, and/or in a case that a switching from the first channel to a second channel is required, and/or in a case that updating a communication parameter is required, the receiver is further configured to:

transmit back-to-back negative-acknowledgement messages through the first channel to the transmitter, and transmit an enhanced acknowledgement message to the transmitter after the back-to-back negative-acknowledgement messages are received, wherein the enhanced acknowledgement message is generated by an MAC layer or an upper layer of a hierarchical network structure; and wherein in a case that the first group of fragments are all correctly received by the receiver, the receiver is configured to:

transmit one positive-acknowledgement message to the transmitter through the first channel.

12. The apparatus according to claim 11, wherein in the case that the one or more fragments in the first group of fragments are not correctly received, the enhanced acknowledgement message comprises information of the one or more fragments, which are not correctly received, in the first group of fragments, wherein the transmitter is further configured to transmit the second group of fragments comprising the one or more fragments that are not correctly received to the receiver after the enhanced acknowledgement message is received.

13. The apparatus according to claim 11, wherein in the case that the switching from the first channel to the second channel is required, the enhanced acknowledgement message comprises information of the second channel, and the transmitter is further configured to transmit the second group of fragments through the second channel after the enhanced acknowledgement message is received.

14. The apparatus according to claim 11, wherein in the case that the updating the communication parameter is required, the enhanced acknowledgement message comprises an updated communication parameter, and the apparatus is further configured to update the communication parameter after the enhanced acknowledgement message is received by the receiver.

15. The apparatus according to claim 11, wherein the enhanced acknowledgement message comprises: indication information, which is used for transmitting a positive-acknowledgement message to the receiver according to the indication information after the enhanced acknowledgement message is received, wherein the transmitter is further configured to transmit a positive-acknowledgement message to the receiver after the enhanced acknowledgement message is received, wherein the positive-acknowledgement message indicates that the enhanced acknowledgement message is correctly received.

* * * * *